United States Patent [19]
Anderson

[11] Patent Number: 5,440,312
[45] Date of Patent: Aug. 8, 1995

[54] AUTO CORRELATION TECHNIQUE FOR -CO-ORDINATE REGISTRATION

[75] Inventor: Stuart J. Anderson, Glen Osmond, Australia

[73] Assignee: The Commonwealth of Australia, The Secretary, Department of Defence, Canberra, Australia

[21] Appl. No.: 903,943

[22] Filed: Jun. 26, 1992

[30] Foreign Application Priority Data

Jun. 27, 1991 [AU] Australia .............................. PK6899

[51] Int. Cl.$^6$ ............................................. G01S 13/04
[52] U.S. Cl. .................................. 342/189; 342/108; 342/145
[58] Field of Search ............... 342/108, 145, 189, 165, 342/173, 174

[56] References Cited

U.S. PATENT DOCUMENTS

| | | | |
|---|---|---|---|
| Re. 31,509 | 1/1984 | Neidell | 342/108 |
| 3,157,874 | 11/1964 | Altar et al. | 342/145 |
| 4,347,511 | 8/1982 | Hofmann et al. | 343/5 |
| 4,489,322 | 12/1984 | Zulch et al. | 343/17.7 |
| 4,602,336 | 7/1986 | Brown | 364/456 |
| 4,899,161 | 2/1990 | Morin, Jr. et al. | 342/451 |
| 4,994,809 | 2/1991 | Yung et al. | 342/108 |

FOREIGN PATENT DOCUMENTS

| | | | |
|---|---|---|---|
| 400064 | 12/1969 | Australia . | |
| 1471792 | 4/1991 | Australia . | |
| 0211623 | 2/1987 | European Pat. Off. | G01S 13/86 |
| 2060306 | 4/1981 | United Kingdom | G01S 13/89 |

Primary Examiner—Mark Hellner
Attorney, Agent, or Firm—Cushman Darby & Cushman

[57] ABSTRACT

A method of co-ordinate registration for Over-the-Horizon Radar comprising the steps of generating a geographic auto correlation function to determine one or more geographic beacons in a coverage area of the Over-the-Horizon Radar, the auto correlation function being in polar co-ordinates, comparing the return radar signal with the geographical map of the coverage area in the general region of the one or more geographic beacons and finding the best fit of the geographic map with return radar signal to enable registration of co-ordinates of the return radar signal. The auto correlation function indicates the amount of correlation between a neighbourhood and a slight displacement from that neighbourhood. A geographic beacon is an area in which there is a substantial difference between the neighbourhood and its surroundings thereby producing a low auto correlation function.

15 Claims, 5 Drawing Sheets

AUTO CORRELATION TECHNIQUE FOR CO-ORDINATE REGISTRATION

BACKGROUND OF THE INVENTION

This invention relates to a method of co-ordinate registration for Over-the-Horizon Radar.

The principle of Over-the-Horizon Radar (OTHR) is to radiate high frequency (HF) power via the ionosphere to long ranges then analyse the backscattered return signal for target and environmental information. The backscattered return data is processed over four domains; namely, azimuth, slant range, Doppler and time.

The location of targets is determined from the signal delay time and the directional characteristics of the radar receiving array. The signal delay time provides an indication of the length of the radar path which gives a slant or group range. For accurate determination of a target's position transformation from slant range to ground range and from radar direction to actual direction must be performed. This transformation is known as co-ordinate registration.

The transformation is complicated by the fact that the ionosphere does not act as a simple reflector. The nature of the ionosphere varies considerably over time and space so that it is not easy to determine the location from which a returned signal has come. It is necessary therefore to provide some method by which return signals can be correlated with a true geographical map. The present invention is directed to this problem.

SUMMARY OF THE INVENTION

In one form the invention may be said to reside in a method of co-ordinate registration for an Over-the-Horizon Radar comprising the steps of: generating a geographic auto correlation function to determine one or more geographic beacons in a coverage area of the Over-the-Horizon Radar; analysing and comparing a return radar signal with a geographic map of the coverage area in the general region of the one or more geographic beacons; and finding the best fit of the geographic map with the radar return signal to enable registration of co-ordinates of the return radar signal.

In preference the radar return signal is analysed in terms of Doppler signature.

In preference the auto correlation function is generated in polar co-ordinates.

The geographic beacons suitable for this invention may be any region in the area of coverage of the radar where a small change in either the distance or azimuth angle will give a significant change in the return radar signal. In one preferred embodiment suitable geographic beacons are land/sea boundaries.

The land will have a Doppler signature centred at zero Hertz (0 Hz) apart from any ionospherically-induced Doppler shifts. While the sea, because of moving waves and currents in the sea and particularly on the surface of the sea, will provide a non-zero Doppler signature. Hence the junction between the substantially zero Doppler land signal and the variable Doppler sea signal provides a suitable geographic beacon.

The auto correlation function indicates the amount of correlation between a neighbourhood and a slight displacement from that neighbourhood. A high correlation will occur where there is little or no change in the nature of the displaced neighbourhood as compared to the original neighbourhood. A low correlation will occur where there is a change, such as where a land/sea boundary occurs and there is a substantial difference between the neighbourhood and its surroundings.

A radar signal received from a region can be described in polar co-ordinates. That is the co-ordinates will be defined in terms of range from the receiver and an angle or azimuth relative to the receiver. To enable the radar return signal to be compared with the geographic beacons identified by the auto correlation function, the geographic map of the radar coverage area may be transformed into polar coordinates before the auto correlation function is generated. Alternatively the transformation may be performed after the auto correlation function is generated.

The comparison and finding of the best fit between the geographic map in the region of the geographic beacons and the return radar signal may be done by a mathematical method such as a least squares minimisation method.

In practice therefore, by this invention, it is preferable to identify a small number of suitable geographic beacons throughout the coverage area of the OTHR and concentrating on correlating these points with the radar return signals, rather than correlating an entire map, which would use a large amount of computing power, much of it to little effect.

In preference two geographic auto correlation functions may be set up, one to identify geographic beacons which are significant in azimuth and the other to identify geographic beacons which are significant in range.

A geographic beacon which is substantially constant at a certain radial distance from a receiving point may be very useful for co-ordinate registration in range but will not be as useful for co-ordinate registration in azimuth. Such a situation will arise from a coastline running perpendicular to the boresight of the radar. Similarly, a coastline running radially from the radar receiver may be very useful as a geographic beacon for azimuth correlation but may not be as useful for range correlation.

An island or oil rig may provide a geographic beacon which is suitable for both azimuth and range correlation.

The first stage in the generation of an auto correlation function is to divide the coverage area into a number of range-azimuth cells. Next a spatial set of contiguous range-azimuth cells are selected to form a correlation neighbourhood or window centred on a reference cell. For example, a block of N consecutive range cells long and M adjacent azimuth cells wide would constitute a rectangular neighbourhood. For each cell in the coverage area a correlation chart is prepared by translating the neighbourhood over a region centred on the reference cell and evaluating a correlation function at each position. The resultant chart shows the variation of the cell's neighbourhood correlation function over the region surrounding the cell.

Where a reference cell lies well within a region which is all land or all sea, the correlation of the cell's neighbourhood will remain high over an extended area. Where the cell's neighbourhood includes land-sea boundaries the correlation will drop significantly as the neighbourhood is translated over the region. By this method there can be produced a neighbourhood correlation which will, in effect, be a contour map of areas of high correlation down to areas of low correlation.

The above discussion refers to the comparison of the Doppler signature of the radar return signal of a cell compared to the Doppler signature of adjoining cells. The invention is not limited to use of the Doppler signature, any feature of the return radar signal that varies geographically can be used to generate a geographic auto correlation function.

To produce the geographic auto correlation function from each of the individual neighbourhood correlation charts the regions of a certain percentage, such as 70% or 50%, correlation for each neighbourhood are collated on an overall chart for azimuth, a separate overall chart for range and/or an overall chart for azimuth and range. From these geographic auto correlation functions a number of significant beacons may be selected to provide coverage of the map. These beacons, which will be distinctive in the coverage area, may then be used to correct the assumed coordinates of the return radar signal.

In one form of the invention this correction may be achieved by correcting the assumed ionospheric height and assumed ionospheric tilt angle used in a theoretical model of the ionospheric propagation resulting in the return radar signal. An advantage of the present invention is that the corrections need only be calculated for the regions surrounding the geographic beacons and these corrected ionospheric parameters can be used in co-ordinate registration of the rest of the radar return signals.

In a further form of the invention image processing techniques may be applied jointly or separately to the geographic auto correlation function and the return radar signal to reduce noise and thereby enhance registration accuracy and/or reliability.

To illustrate the method of coordinate registration reference will be made to the accompanying illustrations showing the stages of the process, in which.

Figure 1:
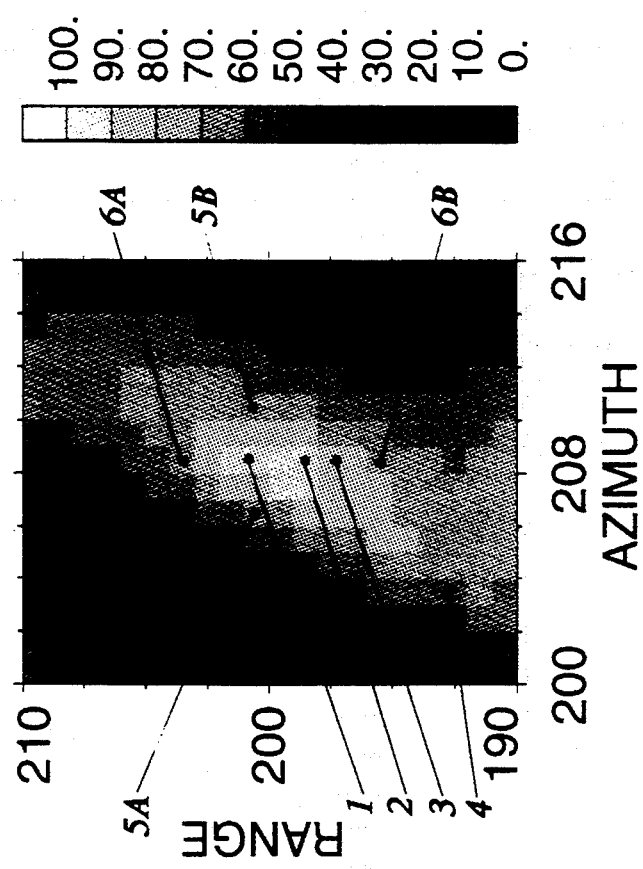
FIG. 1 shows the co-ordinate correlation chart of a particular neighbourhood.

Now looking in detail at FIG. 1 it will be seen that this is a neighbourhood correlation chart range 200 azimuth 208. At the cell marked 1 the correlation of the neighbourhood with itself is 100%. As the neighbourhood is moved away from its natural position, the correlation of this neighbourhood with its surroundings gradually reduces through 90% in region 2 to 80% in region 3 down to 50% in region 4. To generate the chart shown in FIG. 2 from the chart shown in FIG. 1 the 70% correlation width is measured from the cell 5A to the cell 5B which gives a figure of five units. The cell, range 200, azimuth 208, shown as 10 in FIG. 2 therefore has a correlation factor five to six units and as such is only a moderately suitable point for use as a geographic beacon because it has a medium correlation with its surroundings.

Figure 3:
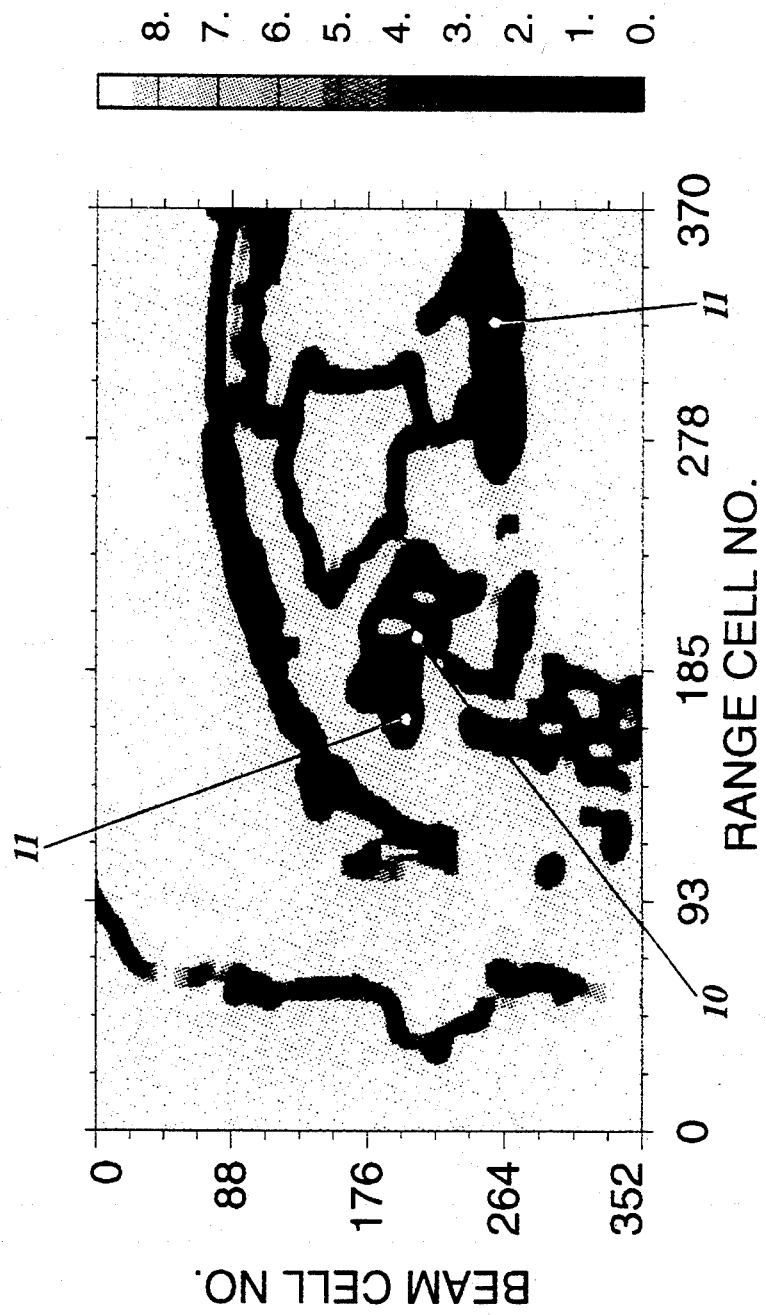
FIG. 3 shows a co-ordinate registration chart for the same area as for FIG. 2 but in range sweep.

To generate the co-ordinate registration chart for a range sweep shown in FIG. 3 from the chart shown in FIG. 1 the 70% correlation depth is measured from cell 6A to 6B, which is nine cells. This is transferred to FIG. 3 which shows that in the range sweep the cell azimuth 208, range 200 has a correlation of greater than eight and hence is an unsuitable point for correlation for range.

Figure 2:
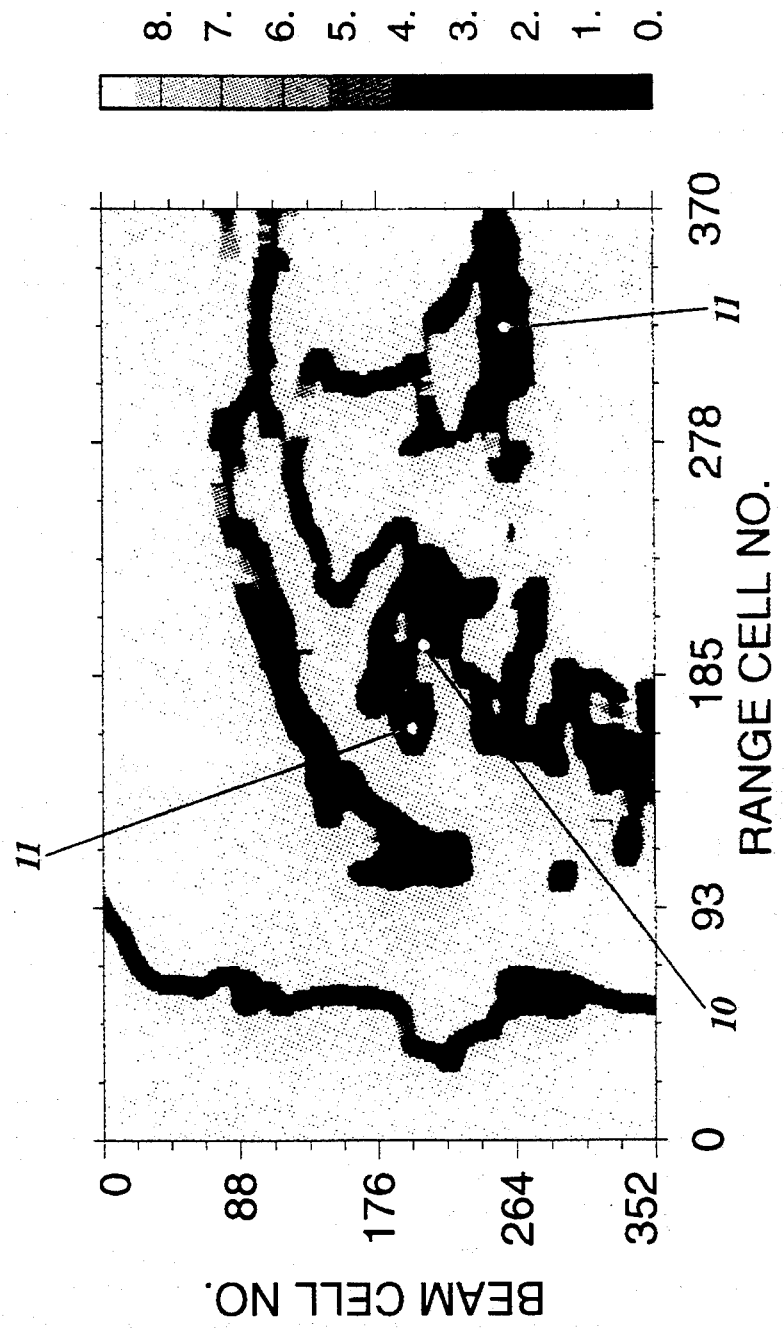
FIG. 2 shows a co-ordinate registration chart in azimuth sweep.

The regions indicated with a correlation figure of below 0.5 in FIG. 2 such as the region 11 would be more useful as a geographic beacon because such a region has low correlation with its surroundings and hence a better chance of co-ordinate registration.

Once a number of geographic beacons for range and azimuth have been identified in the coverage area of the OTHR these may be used to compare a returned radar signal with what may be termed the "real world".

Figure 4:
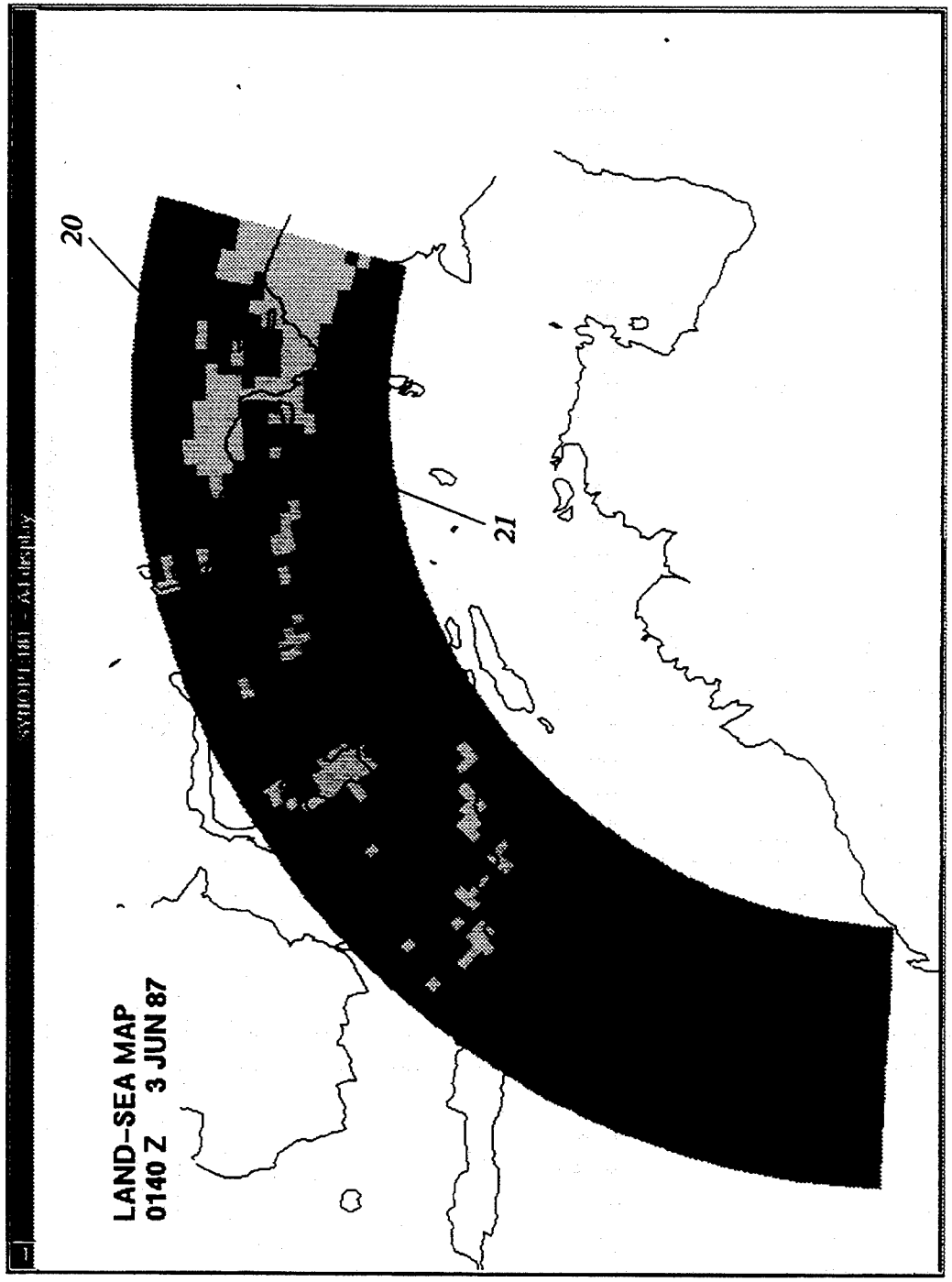
FIG. 4 shows a comparison of a geographic map with an unregistered return radar signal.
Figure 5:
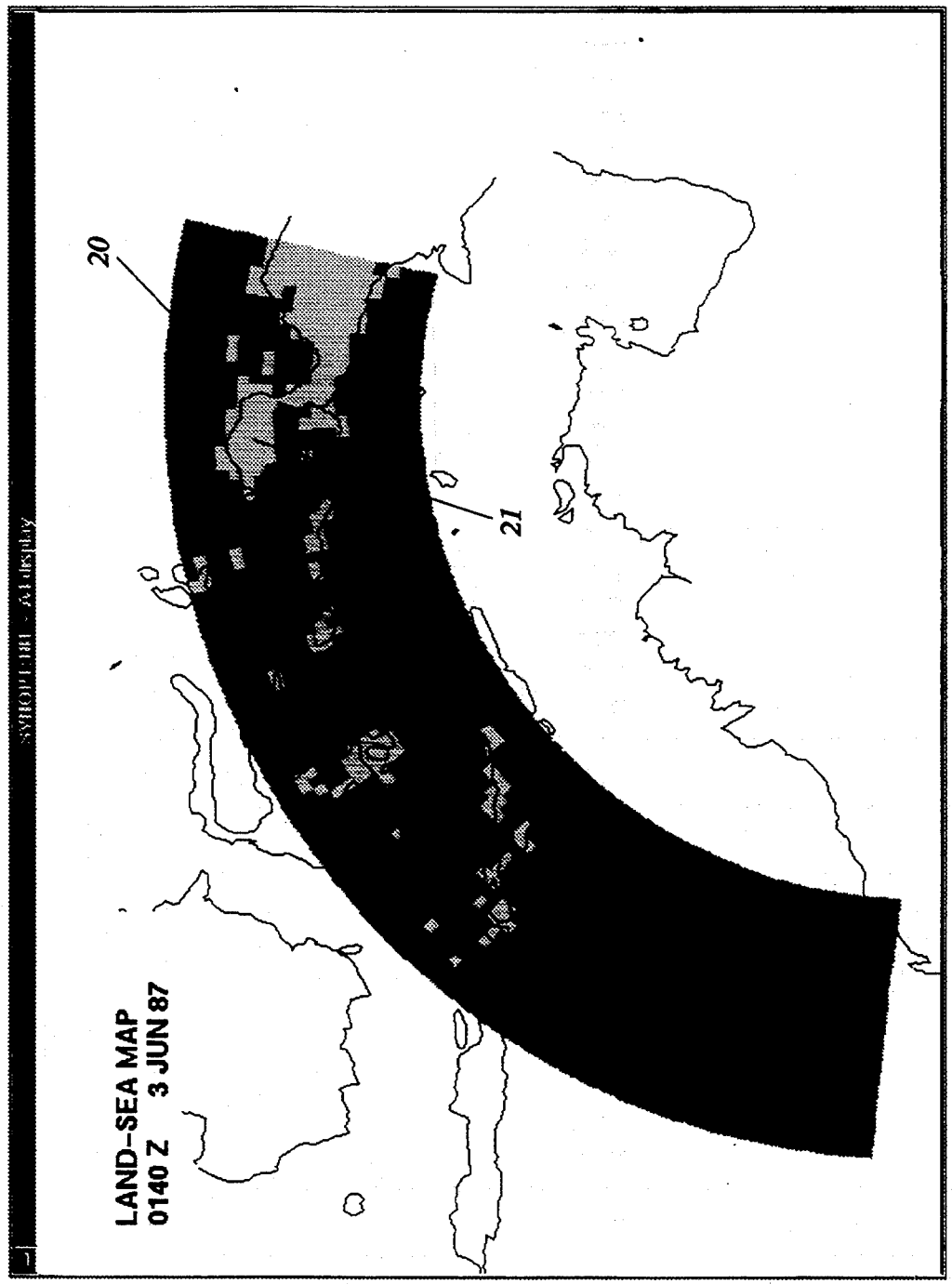
FIG. 5 shows the same area as in FIG. 4 after fitting for range and azimuth.

FIG. 4 shows a return radar signal in which the black band 20 represents regions of sea echo and the paler regions represent regions of land echo. Looking at the underlying map it will be seen that the north west corner of Irian Jaya 21 is not in fact centred in its corresponding return radar signal. Hence the estimated ionosphere tilt and height in that region are recalculated to determine the best fit of the Doppler shifted return signal with the real map to give the correlation shown in FIG. 5.

It is to be noted that because of the nature of the ionosphere layer one correlation point cannot be used for the whole area and in fact some of the areas shown are not as well correlated as others.

It will be seen that by this invention there is provided a method by which geographic beacons may be identified from which it will be possible to correlate a radar return signal with a known geographic map.

Throughout this specification various indications have been given as to the scope of this invention but the invention is not limited to any one of these but may reside in two or more of these combined together. The examples are given for illustration only and not for limitation.

I claim:

1. A method of co-ordinate registration for an Over-the-Horizon Radar comprising the steps of:
generating a geographic auto-correlation function to determine at least one geographic beacon in a coverage area of the Over-the-Horizon Radar;
analyzing and comparing a return radar signal with a geographic map of the coverage area in the general region of the at least one geographic beacon; and
finding a best fit of the geographic map with the radar return signal to enable registration of co-ordinates of the return radar signal.

2. The method of claim 1 in which the return radar signal is analysed in terms of Doppler signature.

3. The method of claim 1 in which the auto correlation function is generated in polar co-ordinates.

4. The method of claim 3 further comprising the step of transforming the geographic map to polar co-ordinates prior to the step of generating the geographic auto-correlation function.

5. The method of claim 1 in which the auto correlation function is transformed to polar co-ordinates after generation.

6. The method of claim 1 in which the geographic beacons are land/sea boundaries.

7. The method of claim 1 further characterised by utilising a mathematical fitting technique to find the best fit between the geographic beacons and the return radar signal.

8. The method of claim 7 in which the mathematical fitting technique is a least squares minimisation technique.

9. The method of claim 3 in which the geographic auto correlation function is an azimuth auto correlation function from which geographic beacons are determined which are useful for azimuth correlation.

10. The method of claim 3 in which the geographic auto correlation function is a range auto correlation function from which geographic beacons are determined which are useful for range correlation.

11. The method of claim 1 in which the step of generating a geographic auto correlation function further includes the steps of:

dividing the coverage area in range and azimuth to define a plurality of cells;

defining a neighbourhood relative to a cell;

comparing each neighbourhood with surrounding neighbourhoods to generate a neighbourhood correlation chart for the cell;

determining at least one correlation value from the neighbourhood correlation chart; and collating the correlation values from the plurality of charts corresponding to the plurality of cells to produce a geographic auto correlation function.

12. A method of co-ordinate registration comprising the steps of transmitting a plurality of signals into a remote geographic region;

receiving return signals backscattered from said remote region;

analysing said return signals and producing a virtual geographic map of the said region;

correlating a real map of the region with itself to identify geographic beacons;

comparing the virtual geographic map with the real geographic map in the region of the geographic beacons; and effecting a co-ordinate transformation of the virtual map to minimise the difference between the real map and the virtual map in the region of the geographic beacons.

13. The method of claim 12 in which the step of analysing said return signals includes determining a Doppler signature of a return signal and assigning the signal a binary value of zero or one corresponding to land or sea.

14. The method of claim 12 in which the step of comparing the virtual map with the real map and effecting a co-ordinate registration includes the step of utilizing a mathematical fitting technique or other method to minimise the difference between the virtual map and the real map.

15. The method of claim 14 in which the mathematical fitting technique is a least squares minimisation technique.

* * * * *